(12) United States Patent
Tartt

(10) Patent No.: US 6,932,056 B1
(45) Date of Patent: Aug. 23, 2005

(54) METHOD FOR REACTING TO KNOCK EVENT IN AN INTERNAL COMBUSTION ENGINE

(75) Inventor: Charles J. Tartt, West Bend, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/772,871

(22) Filed: Feb. 6, 2004

(51) Int. Cl.[7] ............................................. F02P 5/152
(52) U.S. Cl. ............................ 123/406.37; 73/35.06; 123/406.45; 123/435; 701/111
(58) Field of Search ....................... 123/406.21, 406.29, 123/406.38, 406.39, 406.45, 406.47, 435, 123/406.37; 73/35.03–35.06; 701/111

(56) References Cited

U.S. PATENT DOCUMENTS

| 4,711,212 A | 12/1987 | Haraguchi et al. | ..... 123/406.38 |
| 5,090,382 A * | 2/1992 | Bolander et al. | ...... 123/406.33 |
| 5,215,058 A | 6/1993 | Sakakibara et al. | ..... 123/406.38 |
| 6,745,749 B2 * | 6/2004 | Unland et al. | .............. 701/111 |
| 6,845,312 B1 * | 1/2005 | Cross et al. | ................ 701/111 |
| 2003/0183203 A1 | 10/2003 | Unland et al. | ............. 123/486 |

* cited by examiner

Primary Examiner—Tony M. Argenbright
(74) Attorney, Agent, or Firm—William D. Lanyi

(57) ABSTRACT

A control method for controlling an internal combustion engine selects a knock threshold magnitude and compares it to individual knock event magnitudes. The difference between these two values is calculated and limited to be within a predetermined range of values. This limitation selects either an event based control method, a proportional control method, or a control method with characteristics of both techniques. A gain is selected as a function of the algebraic sign of the limited or scaled value and the gain is multiplied by the calculated difference. The result is added to a cumulative value of previously calculated differences multiplied by associated gains. The cumulative value is used as a threshold that activates a plurality of control steps which can include ignition timing changes, fueling changes, or air intake magnitude changes.

23 Claims, 3 Drawing Sheets

METHOD FOR REACTING TO KNOCK EVENT IN AN INTERNAL COMBUSTION ENGINE

BACKGROUND OF THE INVENTION

1. Field of the Invention

The present invention relates generally to a method for controlling an internal combustion engine and, more specifically, to a method for determining a magnitude of knock in an engine and responding with corrective actions based on a cascading introduction of corrective techniques.

2. Description of the Prior Art

Engine knock occurs when fuel ignites prematurely within a combustion chamber of an engine. This can occur as a result of improper engine timing, the use of a fuel with an octane value that is too low, or other reasons. Those skilled in the art of engine control are well aware of various types of knock sensors and techniques to decrease knock by changing an engine operating variable. Typically, a knock sensor comprises an accelerometer that detects physical movement of the engine as a result of a knock event.

U.S. Pat. No. 5,215,058, which issued to Sakakibara et al. on Jun. 1, 1993, describes a knock control apparatus for internal combustion engines. The apparatus comprises a knock detecting unit, a knock intensity value detecting unit for detecting a knock intensity value from a knock detecting output signal of the knock detecting unit within a predetermined crank angle range, a unit for calculating a mean value of the knock intensity value, a unit for calculating a mean deviation between the knock intensity value and the mean value, a cumulative percentage point updating unit for updating a cumulative percentage point of the distribution of the knock intensity value, a first updated quantity calculating unit for calculating a first updated quantity based on the knock intensity value and the cumulative percentage point, a second updated quantity setting unit for setting a second updated quantity for updating the cumulative percentage point updating unit based on the magnitude relationship between the first updated quantity and the mean deviation.

U.S. Pat. No. 4,711,212, which issued to Haraguchi et al. on Dec. 8, 1987, describes an anti-knocking system for an internal combustion engine. The system is intended to prevent knocking in accordance with a knocking condition detected by a knock detecting apparatus on the basis of a distribution pattern of knock magnitude values derived from the output signal of a knock sensor. The knock detection apparatus is arranged to derive a knock magnitude value from the output signal of the knock sensor generated within a predetermined engine rotational angle at an interval thereby obtaining a plurality of knock magnitude values, determine a pattern of distribution of the plurality of the knock magnitude values on the basis of the results of comparison between the frequency that the knock magnitude value exceeds an upper threshold value and the frequency that the knock magnitude value goes below a lower threshold value.

U.S. Pat. No. 6,745,749, which issued to Unlund et al on Jun. 8, 2004, describes a method for adjusting adaptive program maps of an adaptive knock signal in an internal combustion engine and a method for adjusting the knock control in the engine. The method is intended for adjusting an adaptive characteristics map of an adaptive engine-knock control system and a method for adaptively controlling engine knock, the adaptive characteristics map being defined by at least one operating parameter, the adaptive characteristics map for each operating-parameter range being made up of a precontrol component that characterizes the ambient conditions, and a residual component that results from the engine-knock control, the value of the adaptive characteristics map for each operating-parameter range being given by the sum of the precontrol component corresponding to the specific operating-parameter range, and the residual component corresponding to the specific operating-parameter range.

U.S. Pat. No. 6,845,312, which issued to Cross et al on Jan. 18, 2005, discloses a method for detecting engine knock that includes a method for processing knock-related data which reduces the memory locations required for the method and also simplifies the processing steps needed to determine a sum, average, and threshold value relating to magnitudes of knock ratios. Inputs from either pressure sensors or accelerometers are filtered and then used to form a ratio between a knock portion of a curve and a reference portion. Sequential magnitudes of the knock ratio received and analyzed in a manner that reduces required memory locations and improves processing speed.

The patents described above are hereby expressly incorporated by reference in the description of the present invention.

It would be significantly beneficial if a method could be provided that responds to the occurrence of knock events in a way which allows the control methodology to be event driven, proportional, or a combination of both. In addition, it would be beneficial if such a method could also incorporate several different corrective techniques that can be applied in a cascading manner as a function of the cumulative knock history of a particular cylinder of an engine.

SUMMARY OF THE INVENTION

A method for controlling an internal combustion engine, in accordance with a preferred embodiment of the present invention, comprises the steps of determining a knock threshold magnitude, measuring a knock event magnitude, determining a difference between the knock threshold magnitude and the knock event magnitude, and adjusting the difference to be within a predetermined range of allowable magnitudes. It also comprises the steps of selecting a gain factor as a function of the relative magnitudes of the knock threshold magnitude and the knock magnitude, multiplying the difference by the gain factor to form a scaled difference, and forming a cumulative magnitude by adding the scaled difference to a summation of previous magnitudes of scaled differences. In a preferred embodiment, the present invention also comprises the step of taking corrective action as a function of the cumulative magnitude.

In a preferred embodiment of the present invention, the knock event magnitude is a ratio of two measurements taken at different times during a common cylinder combustion event. The gain factor is selected as a function of the algebraic sign of the difference when the difference is determined by subtracting the knock event magnitude from the knock threshold magnitude. In one embodiment of the present invention, the predetermined range extends from −1 to +1 in order to cause the method to be event based rather than proportional. If the predetermined range is increased, the control method becomes more proportional. If the predetermined range is increased to a magnitude greater than any expected knock event magnitudes, the control method becomes completely proportional. The corrective action taken by the present invention can comprise a change in ignition timing, in fueling, or in the magnitude of air intake allowed to flow into the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
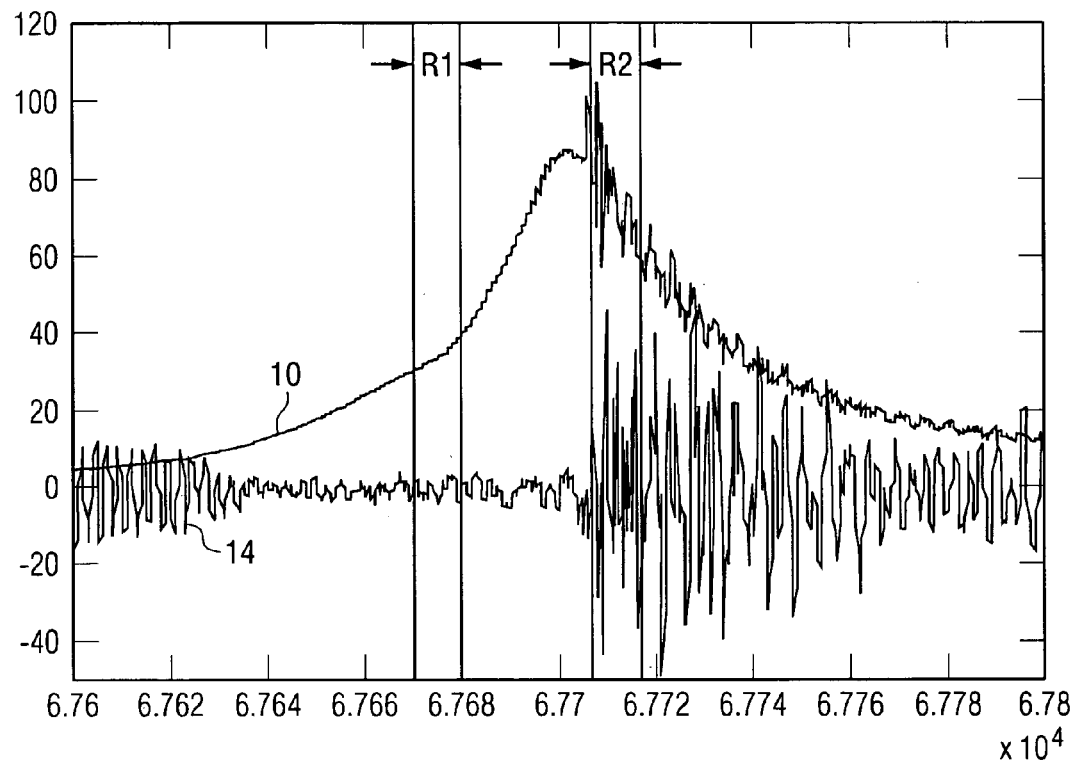
FIG. 1 is a graphical representation of a pressure wave and an accelerometer signal during a single combustion event in a cylinder of an engine.

Throughout the description of the preferred embodiment of the present invention, like components will be identified by like reference numerals.

FIG. 1 shows a graphical representation of a pressure sensor output 10 and an accelerometer output 14. The pressure sensor output 10 shows the rising pressure immediately prior to a combustion event within a combustion chamber of an engine, followed by a knock event as the pressure begins to decrease. The accelerometer output 14 is a measurement of the physical vibration of the engine itself. Two ranges are identified in the graphical representation in FIG. 1. Range R1 is selected to be representative of a relatively stable vibration when a no knock event is expected. Range R2 is selected to capture the effect of a knock event if one occurs. The accelerometer magnitudes within range R1 and range R2 are rectified and integrated to derive an energy magnitude that is representative of the accelerometer signal in each of those two ranges. Then, the integrated value for range R2 is divided by the integrated value for range R1. This results in a ratio of vibration energy, wherein the knock event energy contained within range R2 is compared, as a ratio, to the vibration energy of range R1. This ratio is then used as a representative value of the knock event magnitude severity. Naturally, a relatively low ratio would represent the absence of a knock event, whereas a relatively high ratio would represent the existence of a knock event. The knock event ratio, or knock event magnitude, is calculated for each combustion event within each cylinder of the engine. Corrective action, as will be described in detail below, is then taken to react to and correct the knock condition in each cylinder independently of the other cylinders.

Figure 2:
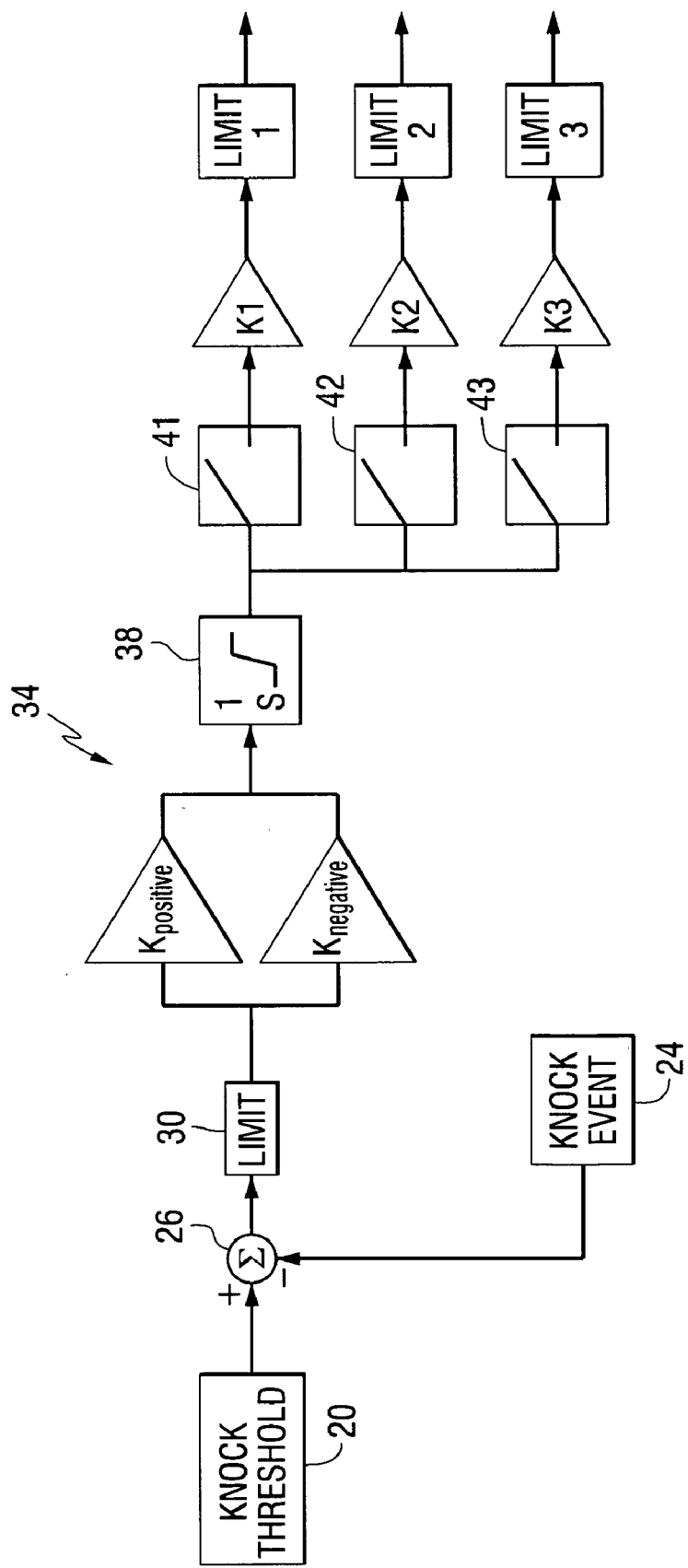
FIG. 2 is a schematic control diagram of the present invention.

FIG. 2 shows a simplified control diagram that describes a preferred embodiment of the present invention. A knock threshold 20 is selected for subsequent comparison to individual knock events. The patent application of Cross et al., described above, provides one method for efficiently determining an appropriate knock threshold magnitude 20. However, it should be understood that alternative methods for determining a knock threshold magnitude are also within the scope of the present invention. A knock event magnitude 24 is then determined. As described above in conjunction with FIG. 1, the knock event magnitude in a preferred embodiment of the present invention is the ratio of the integrated accelerometer output 14 determined for ranges R1 and R2. It should be understood that although this ratio is referred to herein as a knock event magnitude, the value of that knock event magnitude may be less than a magnitude which is indicative of actual engine knock. In other words, this ratio is referred to as a knock event magnitude even though its actual magnitude may often be significantly less than a threshold used to determine whether or not it is truly a knock event.

With continued reference to FIG. 2, the knock event magnitude 24 is subtracted from the knock threshold magnitude 20 at the point identified by reference numeral 26 in FIG. 2. The mathematical difference between the knock event magnitude 24 and the knock threshold magnitude 20 is then adjusted to assure that it is within a predetermined range of allowable magnitudes. This is done by placing an upper and lower limit 30 on the calculated difference between the knock event magnitude and the knock threshold magnitude. In effect, this operation truncates the magnitude of the difference to a value within the upper and lower limits.

The allowable range used at point 30 in FIG. 2 can be changed in order to change the characteristics of the control methodology. In other words, if limits of plus and minus 1 are used, the control method becomes event based and the actual varying magnitude of the difference calculated at point 26 is not as important to the control method as the mere existence of a knock event. Since differences between the knock event magnitude 24 and the knock threshold magnitude 20 of 1.0, 50.0, and 300.0 are each treated identically when the limit at point 30 is plus or minus 1, the control methodology is truly event based and not proportional for all magnitudes greater than one. If, on the other hand, the limit 30 is changed to plus or minus 500, the magnitude of the difference determined at point 26 becomes significant and the control method becomes much more proportional for magnitudes less than 500. The present invention allows the methodology to be selected, between completely event based and completely proportional, by merely changing the limits used at point 30 in FIG. 2.

With continued reference to FIG. 2, the results of the limit operation at point 30, which creates a scaled difference, are used to select a gain factor at point 34 in FIG. 2. The positive and negative gains, which are determined as a function of the algebraic sign of the output from the limit 30, are different from each other in a preferred embodiment of the present invention. In one embodiment of the present invention, the positive gain factor is approximately $2.0\times10^{-3}$ and the negative gain factor is approximately 0.5, but it should be understood that the specific magnitudes of these gain factors are intended to be selected as a function of the specific application of the control method and are not limiting to the present invention.

With continued reference to FIG. 2, the difference from point 26 in FIG. 2, which is limited by the limit 30, is multiplied by the gain factor selected at point 34. It is then added to an accumulation 38, the sum of which increases or decreases as the subsequent relative values of the knock event magnitude 24 and knock threshold magnitude 20 change. The cumulative magnitude determined at point 38 is used by several different control methodologies to affect operating characteristics of the engine.

A first magnitude of the cumulative value 38 is used, figuratively, as a switch 41 to activate or deactivate a first method of controlling the engine. In a preferred embodiment of the present invention, this first method is a change in ignition timing. Timing might be retarded to reduce knock, such as by changing the ignition timing from 20 degrees before top dead center (BTDC) to 18 degrees before top dead center (BTDC). As the absolute magnitude of the cumulative value 38 decreases in response to the ignition timing change, the ignition timing may then be advanced, such as back from 18 degrees before top dead center (BTDC) to 20 degrees before top dead center (BTDC).

The second switch 42 can be used to activate or deactivate changes in fueling. Since increases in fueling can have a cooling effect on the ignition event, knock can be reduced in this way.

The third figurative switch 43 can control the activation or deactivation of a method for changing the air intake magnitude of the engine.

It is intended that each of the three corrective actions, represented by switches 41–43 in FIG. 2, be independent from each other, but based on a common cumulative magnitude 38. Each would have its own gain and limit, as illustrated in FIG. 2, and would respond to the magnitude of the cumulative value maintained at point 38. As an example, the ignition timing activation 41 could occur when the value of the cumulative magnitude 38 is any nonzero amount or, alternatively, only when the cumulative magnitude exceeds a preselected threshold. Similarly, the fueling changes 42 and the air intake changes 41 can be provided with their own threshold magnitudes at which they are activated. As a result, the distinctly different forms of corrective action represented by the ignition timing, fueling, and air intake magnitudes, can be introduced in a cascading manner as the overall value of the cumulative magnitude 38 increases or decreases.

With continued reference to FIG. 2, two features of the present invention provide significant advantages in comparison to known knock prevention systems. First, the limit 30 allows the controlled algorithm to be characterized as an event based control method, a proportional control method, or a control method that has attributes of both of these techniques. This can be done by simply changing the limits applied to the difference which is calculated at point 26. Similarly, the cascading effect provided by the activation and deactivation switches, 41–43, allow different corrective techniques to be brought into action independently from each other and only when the value of the cumulative magnitude 38 indicates that such action is desirable.

Figure 3:
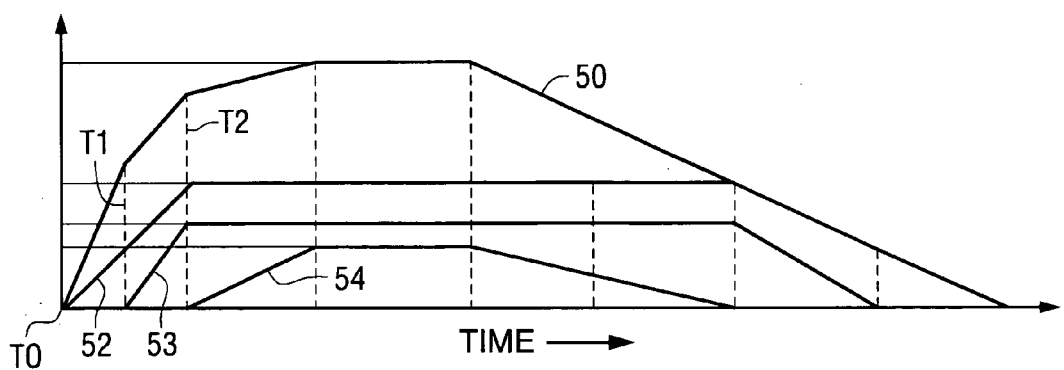
FIG. 3 is a hypothetical graphical representation of the effects of various control methods being implemented in a cascade manner.

In FIG. 3, the graphical representation is presented as a function of time, with the vertical axis being representative of a magnitude. The magnitude of the vertical axis can apply to the actual value of the cumulative magnitude 38 described above in conjunction with FIG. 2 or some other measure of knock intensity. This line 50, in general, represents the intensity of the knock condition of an engine. Line 52 represents a progressive activity of the ignition timing control portion 41 of the diagram shown in FIG. 2. Similarly, line 53 represents the cumulative effect of the fueling change 42 described above in conjunction with FIG. 2. Lastly, line 54 represents the progressive action of the air intake control leg of the diagram shown in FIG. 2.

At time T0, the ignition timing leg 41 is activated to reduce a knock condition of the engine. At time T1, represented by line 52, the fueling leg 42 of the control algorithm in FIG. 2 is activated. The magnitude 50 of the cumulative value 38 is effected by the activation of the fuel control leg 42, beginning at time T1. At time T2, as represented by line 53, the third control leg, or air intake leg, of the control diagram 42 is activated with a corresponding change in the magnitude of the cumulative value 38. Eventually, the combined effect of the three control legs, 41–43, decreases the knock to acceptable levels. It should be understood that FIG. 3 is highly schematic and is not intended to represent actual values of these control parameters. Instead, it is intended to illustrate that the three different control techniques, 41–43, can be cascaded as a function of the magnitude of the cumulative value 38 described above.

Figure 4:
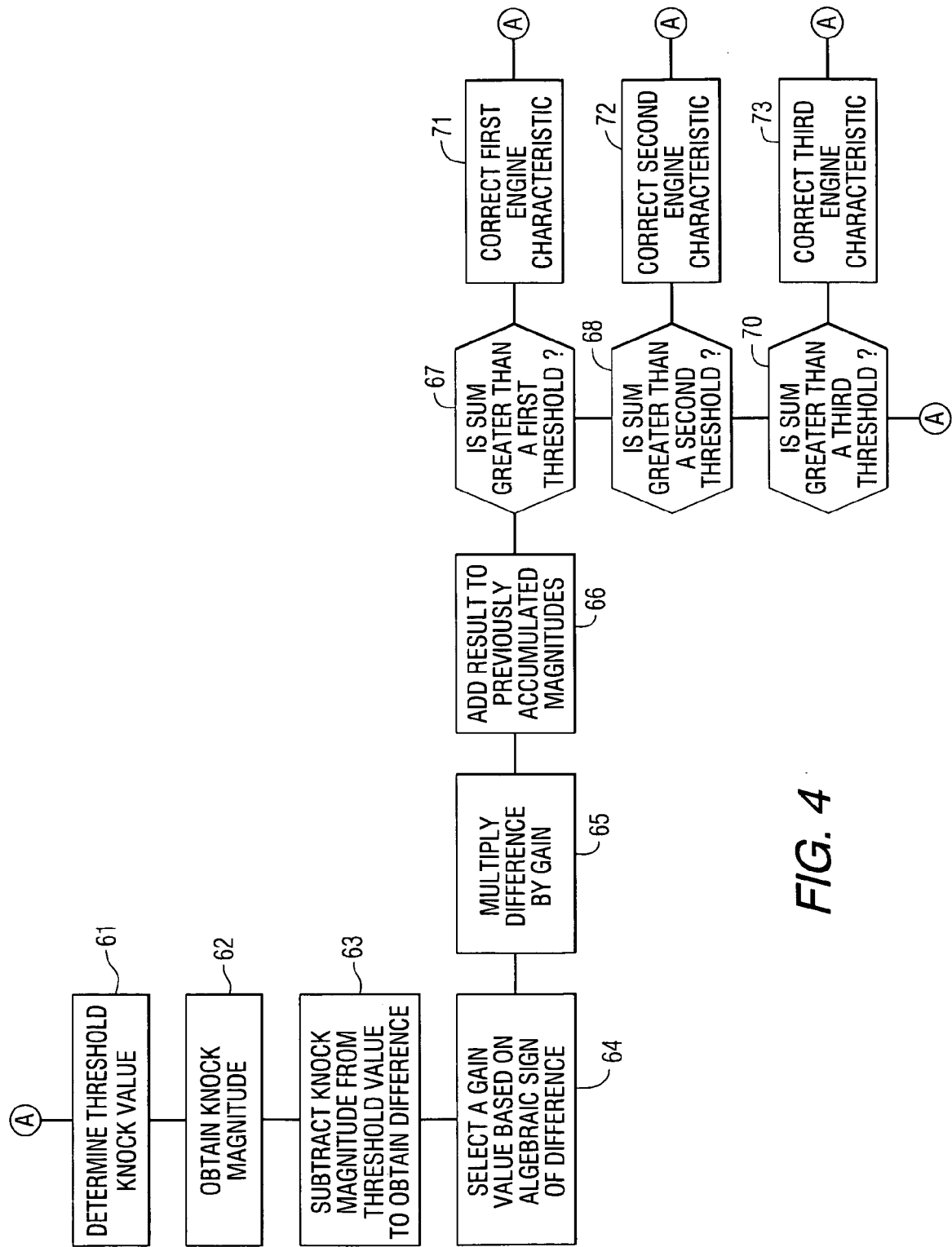
FIG. 4 is a flowchart showing the steps taken during the performance of the method of the present invention.

FIG. 4 is a schematic flow chart showing the various processes and steps that are used by the present invention. At the beginning of the process, a threshold knock value, or magnitude, is determined at functional block 61 and a knock event magnitude is determined at functional block 62. Functional block 61 is analogous to item 20 in FIG. 2 and functional block 62 is analogous to block 24 in FIG. 2. The knock event magnitude is subtracted from the knock threshold magnitude in order to obtain the difference at functional block 63. The operation of limiting the magnitude of the difference can also be performed at that point, in the operation identified as functional block 63. The gain, as described above in conjunction with item 34 in FIG. 2, is selected as a function of the algebraic sign of the difference at functional block 64 in FIG. 4. The difference is multiplied by the gain at functional block 65 and the results are added to previously accumulated magnitudes at functional block 66, which is analogous to the summation point 38 in FIG. 2. The sum is interrogated to be at functional blocks 67, 68, and 70 to determine whether the value exceeds an associated threshold which would activate the associated changes in engine characteristic. These corrections are represented at functional blocks 71, 72, and 73 in FIG. 4. It should be understood that functional blocks 67 and 71 are related to item 41 in FIG. 2, functional block 68 and 72 are related to block 42 in FIG. 2 and functional blocks 70 and 73 are related to block 43 in FIG. 2. Although FIG. 4 is configured to represent a return to the starting point A after each of the correction blocks, 71–73, it should be understood that alternative embodiments could direct the logic of the program to the other decision blocks, 68 and 70, after the first engine characteristic is corrected. This would result in all of the corrections, 71–73, being possibly performed simultaneously if the value of the cumulative magnitude 38 is sufficient to warrant this. Whether or not the control method interrogates the sum at decision block 68 following the performance of the first engine characteristic at functional block 71 is not limiting to the present invention. Either of these two alternative embodiments is acceptable within its scope.

With reference to FIGS. 1–4, it can be seen that the method for controlling the internal combustion engine, in accordance with a preferred embodiment of the present invention, comprises the steps of determining a knock threshold magnitude, such as that which is described in the Cross et al. patent application described above. It also comprises the step of measuring a knock event magnitude, which is the ratio of the integrated values of an accelerometer signal 14 in ranges R1 and R2 of FIG. 1. It determines a difference 26 between the knock threshold magnitude and the knock event magnitude, adjusts the difference so that it is within a predetermined range of allowable magnitudes at the limit step 30 in FIG. 2, and then selects a gain factor 34 as a function of the relative magnitudes of the knock threshold magnitude and the knock event magnitude. The difference is multiplied by a gain factor that is selected as a function of the algebraic sign of the scaled difference which is an output of block 30 in FIG. 2. The difference, after being multiplied by the gain factor, is added to a cumulative value 38 to form a summation of previous magnitudes of scaled differences. Corrective action is taken as a function of the cumulative magnitude 38. The knock event, as described above, is determined as a ratio of the two measurements or integrated values taken at two different times, R1 and R2, during a common cylinder combustion event. The limit 30 can use a range of −1 to +1 or, alternatively, can use any other range from minus infinity to plus infinity. The corrective action can be ignition timing 41, fueling 42, or air intake flow magnitude 43.

Although the present invention has-been described with particular specificity to illustrate a preferred embodiment, like components will be identified by like reference numerals.

I claim:

1. A method for controlling an internal combustion engine, comprising the steps of:
   determining a knock threshold magnitude;
   measuring a knock event magnitude;
   determining a difference between said knock threshold magnitude and said knock event magnitude;
   adjusting said difference to be within a predetermined range of allowable magnitudes;
   selecting a gain factor as a function of the relative magnitudes of said knock threshold magnitude and said knock event magnitude;
   multiplying said difference by said gain factor to form a scaled difference;
   forming a cumulative magnitude by adding said scaled difference to a summation of previous magnitudes of scaled differences; and
   taking corrective action as a function of said cumulative magnitude.

2. The method of claim 1, wherein:
   said knock event magnitude is a ratio of two measurements taken at two different times during a common cylinder combustion event.

3. The method of claim 1, wherein:
   said gain factor is selected as a function of the algebraic sign of said difference when said difference is determined by subtracting said knock event magnitude from said knock threshold magnitude.

4. The method of claim 1, wherein:
   said predetermined range extends from −1 to +1.

5. The method of claim 1, wherein:
   said corrective action comprises changing ignition timing.

6. The method of claim 1, wherein:
   said corrective action comprises changing fueling.

7. The method of claim 1, wherein:
   said corrective action comprises changing an air intake flow magnitude.

8. The method of claim 1, further comprising:
   changing ignition timing in response to said cumulative magnitude exceeding a first magnitude; and
   changing fueling in response to said cumulative magnitude exceeding a second magnitude.

9. The method of claim 8, further comprising:
   changing an air intake flow magnitude in response to said cumulative magnitude exceeding a third magnitude.

10. A method for controlling an internal combustion engine, comprising the steps of:
    determining a knock threshold magnitude for said engine;
    measuring a knock event magnitude relating to a combustion event of said engine;
    determining a difference between said knock threshold magnitude and said knock event magnitude;
    selecting a range of allowable magnitudes for said difference;
    adjusting said difference to be within said range of allowable magnitudes for said difference;
    selecting a gain factor as a function of the algebraic sign of said difference when said difference is determined by subtracting said knock event magnitude from said knock threshold magnitude;
    multiplying said difference by said gain factor to form a scaled difference;
    forming a cumulative magnitude by adding said scaled difference to a summation of previous magnitudes of scaled differences; and
    taking corrective action as a function of said cumulative magnitude.

11. The method of claim 10, wherein:
    said knock event magnitude is calculated as a ratio of two knock amplitude measurements taken at two different times during a cylinder combustion event.

12. The method of claim 11, wherein:
    said predetermined range extends from −1 to +1.

13. The method of claim 12, further comprising:
    changing ignition timing in response to said cumulative magnitude exceeding a first magnitude; and
    changing fueling in response to said cumulative magnitude exceeding a second magnitude.

14. The method of claim 13, further comprising:
    changing an air intake flow magnitude in response to said cumulative magnitude exceeding a third magnitude.

15. A method for controlling an internal combustion engine, comprising the steps of:
    determining a knock threshold magnitude;
    measuring a knock event magnitude;
    determining a difference between said knock threshold magnitude and said knock event magnitude;
    adjusting said difference to be within a predetermined range of allowable magnitudes;
    forming a cumulative magnitude by adding said difference to a summation of previous magnitudes of said differences; and
    taking corrective action as a function of said cumulative magnitude.

16. The method of claim 15, further comprising:
    selecting a gain factor as a function of the relative magnitudes of said knock threshold magnitude and said knock event magnitude;
    multiplying said difference by said gain factor to form a scaled-difference.

17. The method of claim 16, further comprising:
    selecting a gain factor as a function of the relative magnitudes of said knock threshold magnitude and said knock event magnitude;
    multiplying said difference by said gain factor to form a scaled difference, said forming step comprising the step of forming said cumulative magnitude by adding said difference to a summation of previous magnitudes of said scaled differences.

18. The method of claim 15, further comprising:
    changing a first engine operating characteristic in response to said cumulative magnitude exceeding a first magnitude; and
    changing a second engine operating characteristic in response to said cumulative magnitude exceeding a second magnitude.

19. The method of claim 18, wherein:
    said first engine operating characteristic is ignition timing.

20. The method of claim 15, wherein:
    said knock event magnitude is a ratio of two measurements taken at two different times during a common cylinder combustion event.

21. The method of claim 17, wherein:
    said gain factor is selected as a function of the algebraic sign of said difference when said difference is determined by subtracting said knock event magnitude from said knock threshold magnitude.

22. The method of claim 15, wherein:
    said predetermined range extends from −1 to +1.

23. The method of claim 18, further comprising:
    changing an air intake flow magnitude in response to said cumulative magnitude exceeding a third magnitude.

* * * * *